United States Patent
Miyazaki et al.

(10) Patent No.: US 6,850,472 B2
(45) Date of Patent: Feb. 1, 2005

(54) OPTICAL PICKUP DEVICE AND FOCUS CONTROL METHOD

(75) Inventors: Osamu Miyazaki, Soraku-gun (JP); Ikuo Nakano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 545 days.

(21) Appl. No.: 10/025,142

(22) Filed: Dec. 19, 2001

(65) Prior Publication Data

US 2002/0089905 A1 Jul. 11, 2002

(30) Foreign Application Priority Data

Dec. 21, 2000 (JP) ........................................ 2000-389503

(51) Int. Cl.⁷ ................................................ G11B 7/00
(52) U.S. Cl. ................. 369/53.23; 369/44.41; 369/53.28; 369/112.01; 369/112.15
(58) Field of Search ............................ 369/44.41, 44.29, 369/44.37, 53.23, 53.28, 112.15, 112.12, 112.11, 112.03, 112.1, 112.05

(56) References Cited

U.S. PATENT DOCUMENTS 4,850,695 A * 7/1989 Mikuriya et al. ......... 369/44.41
5,708,638 A * 1/1998 Braat et al. .............. 369/53.22

FOREIGN PATENT DOCUMENTS

| JP | 07-006372 | 1/1995 |
| JP | 10-500526 | 1/1998 |
| JP | 2000-011401 | 1/2000 |
| JP | 2000-163796 | 6/2000 |

* cited by examiner

Primary Examiner—William Korzuch
Assistant Examiner—Jorge L. Ortiz-Criado
(74) Attorney, Agent, or Firm—David G. Conlin; Steven M. Jensen; Edwards & Angell, LLP

(57) ABSTRACT

An optical pickup device includes a detection-use condenser lens for focusing a reflected light from a disk of a light emitted from a light source; a hologram element for dividing a light passed through the detection-use condenser lens into a light passed through a high numerical aperture region and a light passed through a low numerical aperture region; and a photodetector including at least a first light receiving element for detecting the laser beam which passed through the high numerical aperture region and a second light receiving element for detecting the laser beam which passes through the low numerical aperture region. Based on output signals from the first light receiving element and the second light receiving element, a focus error signal FE1 and a focus error signal FE2 are prepared respectively. According to an output value of the photodetector, a focus control is performed based on the error signal FE1 or the focus error signal FE2.

12 Claims, 11 Drawing Sheets

OPTICAL PICKUP DEVICE AND FOCUS CONTROL METHOD

FIELD OF THE INVENTION

The present invention relates to an optical pickup device for recording and reproducing information on and from an optical disk, and also relates to a focus control method.

BACKGROUND OF THE INVENTION

Conventionally, optical disks such as optical disks, magneto-optical disks, etc., for recording/reproducing information using a laser are known. In recent years, in order to realize a higher recording capacity, the techniques for increasing recording density of the optical disks have been developed, and with an increase in recording density, the recording pit becomes smaller in size.

In an optical pickup device for reproducing information recorded on an optical disk at high density, in order to read out the data recorded in a fine region, it is required to focus a light beam onto such fine region on the optical disk. Namely, by reducing the spot size, it becomes possible to record a greater amount of information.

The spot size is proportional to a wavelength $\lambda$ of the light source, and is inversely proportional to the numerical aperture NA of an objective lens. Therefore, in order to reduce the size of a light spot, it is required to either reduce the wavelength $\lambda$ to be used, or increase the numeral aperture NA of the objective lens.

For example, for CDs (Compact Discs), wavelength $\lambda$=780 nm; numerical aperture NA=0.45, and a recording capacity=650 MB. For DVDs, wavelength $\lambda$=650 nm; numerical aperture NA=0.60; and a recording capacity=4.7 GB. Therefore, the DVDs (Digital Versatile Discs) offer smaller light spot by reducing the waveform $\lambda$ and increasing the numeral aperture NA. As a result, the DVDs have high recording capacity of around 7 times as high as that of the CDs, and thus a greater amount of information can be stored therein as compared to the CDs.

By the way, when performing recording/reproducing operation with respect to an optical disk, surface fluctuations of the optical disk are likely to occur. Here, to maintain the data recording surface of the optical disk within the focal depth of the objective lens, a focus control is performed to maintain an interval between the optical disk and the objective lens constant. For this focus control, conventionally, the Foucault method, the astigmatic method, etc., are known.

In the Foucault method, a knife edge is provided in an optical path of a light reflected from the optical disk. At the knife edge, a half of the reflected light from the optical disk is shielded. Two-split light receiving elements are provided at a focal point of the objective lens for use in detecting a reflected light when the objective lens is at focus with respect to the optical disk. When the objective lens is at a correct focus position, the reflected light to focus the two split light receiving elements will be balanced (impinges at the midway between the two split light receiving elements) so that the difference of the outputs of these two light receiving elements will be zero. On the other hand, when the objective lens is out-of-focus position due to the up-and-down movements of the optical disk, the reflected light impinges at position shifted to the left or to the right from the midway, resulting in a difference between a signal obtained from the left receiving element and a signal obtained from the right receiving element. Then, by detecting this difference in signal, a focus error signal is obtained.

In the astigmatic method, optical components including a cylindrical lens, an oblique glass plate, etc., are provided on the optical path of the light reflected from the optical disk. As a result, the reflected light becomes astigmatic, and two caustic lines appear so as to cross at right angle. In response, four-split detectors are provided in a minimum circle of confusion in around the midway of the two caustic lines. The direction of the two pairs of the light receiving elements in the four-split detectors is set to the direction of the two caustic lines. When the optical disk is at a correct focus position, the respective total amounts of light received by each pair of the two light receiving elements which face one another are equal. On the other hand, when the optical disk is at out-of-focus position as being moved up and down, a total amount of light received by one pair will be different from that received by the other pair. Therefore, a focus error signal is obtained by detecting a difference in signal obtained from the respective pairs of the light receiving elements.

In the described focus control, the reflected light from the optical disk is converged onto the light receiving element by the focus error signal detection-use condenser lens, and the amount of light received by the light receiving element at the focus spot is processed with signals. As a result, a focus error signal is detected. In the focus control, in order to ensure that the focus error signal to be detected has a predetermined signal level, the objective lens is shifted by controlling the driving of an actuator having mounted thereon the objective lens, and then a focus servo loop is formed. In this way, an interval between the data recording surface of the optical disk and the objective lens can be maintained constant, and a laser beam can be kept at a focal point.

When performing a focus control, a focus servo loop is formed based on a focus error signal so that the information recording surface of the optical disk is positioned at an optimal image surface of the objective lens. The range where the focus servo loop satisfying the above condition can be formed almost corresponds to a range just before the light spot starts being displaced to the outside of the light receiving surface of the light receiving element for use in the focus error signal detection use optical system. Therefore, the range where the focus servo loop satisfying the above range can be formed depends on the relationship between the objective lens and the longitudinal magnification of the focus error signal detection use condenser lens, as well as the area of the light receiving surface of the light receiving element.

In recent years, with reduction in size and weight of the optical disk devices such as CDs, a light-weight, miniaturized optical pickup device is also demanded. Such light-weight, miniaturized optical pickup device can be realized, for example, by reducing the effective diameter of the objective lens. In this case, a focal distance of the objective lens is shortened. On the other hand, in order to increase the recording capacity of the optical disk, it is required to reduce the spot size. To this end, if the numerical aperture of the objective lens is increased, the focal length of the objective lens will be still shortened.

When the focal length of the objective lens is reduced, however, from the relationship between the objective lens and the longitudinal magnification of the focus error signal detection use condenser lens, a range where the focus servo loop can be formed becomes smaller.

Therefore, when recording or reproducing information on and from the optical disk, if the optical disk or the optical pickup device has some impact, or dust particles adhere onto the recording surface of the optical disk, the oscillation wavelength of the semiconductor laser abruptly changes within the range of several nms. For example, in an event that the mode hopping phenomenon, i.e., the focal point of the optimal image surface of the objective lens is displaced, occurs, the objective lens may be displaced from the range where the focus servo loop can be formed. Further, in the optical pickup device, when the objective lens is once displaced from the range where the focus servo loop can be formed, a focus pulling-in operation is performed by fluctuating the actuator having mounted thereon the objective lens. In this way, the focus servo loop is formed again.

Here, for the objective lens having a shorter focal distance, in general, the distance (working distance) between the optical disk and the objective lens is short. Therefore, the objective lens may hit the optical disk. When some damage occurs between the objective lens and the optical disk, the optical pickup device may be damaged.

Here, in order to prevent the objective lens from being displaced from the range where the focus servo loop can be formed, this range for the formation of the focus servo loop may be increased. To this end, however, for example, when the area of the focus error signal receiving element is increased, the response rate of the light receiving element is reduced, thereby adversely affecting the high speed detection of the reproducing signal from the optical disk.

The range where the focus servo loop can be formed may be increased by reducing the focal length of the objective lens in consideration of the relationship between the objective lens and the longitudinal magnification of the focus error signal detection use condenser lens, a shift amount of a beam focal point of the condenser lens with respect the shift amount of the magneto-optical disk becomes smaller, resulting in a lower detection sensitivity of the focus error signal.

SUMMARY OF THE INVENTION

It is an essential object of the present invention to provide an optical pickup device and a focus control method which prevent a displacement of a focus servo loop.

In order to achieve the above object, the optical pickup device of the present invention is arranged so as to include:

a light source for emitting a light;

a condenser lens for focusing a reflected light from a recording medium of the light emitted from the light source;

dividing means for dividing a light passed through the condenser lens into a light passed through a high numerical aperture region of the condenser lens and a light passed through a low numerical aperture region of the condenser lens;

light receiving means including at least a first light receiving element for detecting the light passed through the high numerical aperture region and a second light receiving element for detecting the light passed through the low numerical aperture region; and focus control means which prepares a first focus error signal based on an output signal at least from the first light receiving element and a second focus error signal based on an output signal from the second light receiving element, and which performs a focus control based on either the first focus error signal or the second focus error signal according to an output value from the light receiving means.

In order to achieve the above object, the focus control method of the present invention is arranged so as to include the steps of:

dividing a light emitted from a light source and is reflected from a recording medium into a light passed through a high numerical aperture region of a condenser lens for focusing a light beam and a light passed through a low numerical aperture region of the condenser lens;

detecting the light passed through the high numerical aperture region and the light passed through the low numerical aperture region separately; and performing a focus control based on a first focus error signal obtained from the light passed through at least the high numerical aperture region and the second focus error signal obtained from the light passed through the low numerical aperture region, wherein the focus control is performed based on either the first focus error signal or the second focus error signal as selected based on at least one of a characteristic curve of the first focus error signal, a characteristic curve of the second focus error signal, an amount of received light for generating the first focus error signal and an amount of received light for generating the second focus error signal.

According to the foregoing structure and the method of the present invention, by suitably selecting the first focus error signal of high sensitivity or the second focus error signal which offers a range where the focus servo loop can be formed, a focus servo loop can be formed.

Additionally, an output value of the light receiving means based on which a selection is made between the first focus error signal and the second focus error signal, for example, as a signal for forming the focus servo loop, a signal indicative of acceptance of the first focus error signal, and a signal indicative of non-acceptance of the first focus error signal and acceptance of the second focus error signal.

Accordingly, a broader range can be ensured for the formation of the focus servo loop, and therefore, for example, such effect that a focal point of the objective lens is less likely to be displaced out of the focus servo loop even at an occurrence of such event that a disk or an entire optical pickup device receives some impact, or dusts adhere onto a recording surface of the disk, and a focus control can be performed with desirable sensitivity.

Additional objects, features, and strengths of the present invention will be made clear by the description below. Further, the advantages of the present invention will be evident from the following explanation in reference to the drawings.

BRIEF DESCRIPTION OF THE DRAWINGS

FIGS. 6(a) through 6(c) are explanatory views illustrating the degree of expansion of the laser beam on the photodetector, wherein FIG. 6(a) shows a laser beam in a state where a disk is positioned further from an optimal image surface of the objective lens; FIG. 6(b) shows a laser beam in a state where a disk is positioned at a correct focus with respect to the optimal image surface of the objective lens; while FIG. 6(c) shows a laser beam in a state where a disk is positioned closer with respect to an optimal image surface of the objective lens;

DESCRIPTION OF THE EMBODIMENTS

First Embodiment

The following will explain one embodiment of the present invention with reference to FIG. 1 through FIG. 8.

Figure 1:
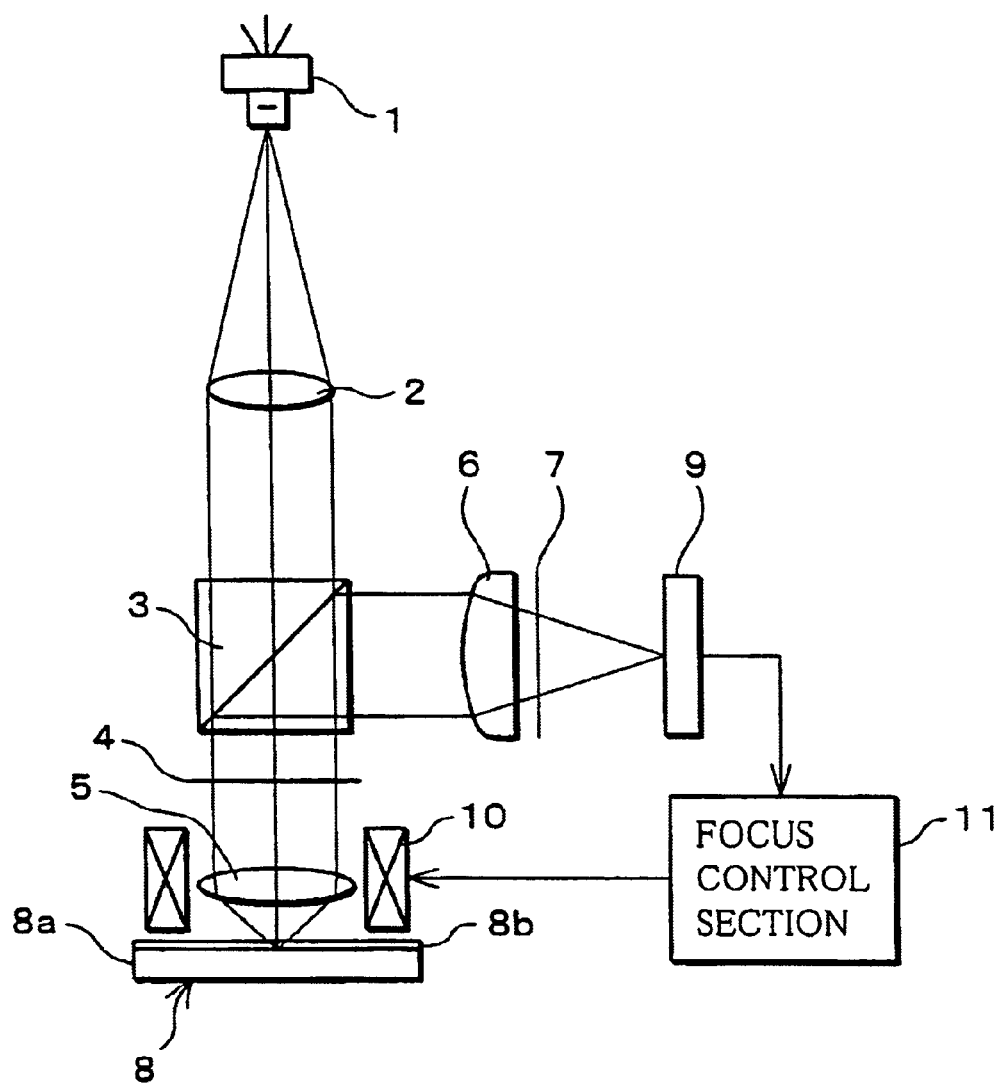
FIG. 1 is an explanatory view illustrating the structure of an optical pickup device in accordance with one embodiment of the present invention.

FIG. 1 is an explanatory view schematically illustrating the structure of an optical pickup device. As illustrated in FIG. 1, the optical pickup device in accordance with the present embodiment includes a semiconductor laser (light source) 1, a collimator lens 2, a polarization beam splitter 3, a quarter-wave plate 4, an objective lens 5, a detection-use condenser lens 6, a hologram element 7, a photodetector 9, an actuator 10 for driving the objective lens 5, and a focus control section (focus control means) 11. The foregoing optical pickup device records and reproduces information on and from a disk (recording medium) 8.

The semiconductor laser 1 serving as a light source, for example, emits a laser beam having a wavelength of 650 nm. The wavelength of a laser beam emitted from the semiconductor laser 1 is not particularly limited, and for example, a laser beam having a wavelength of 405 nm may be emitted. The collimator lens 2 is provided for converting the laser beam emitted from the semiconductor laser 1 into a parallel beam.

The polarization beam splitter 3 is prepared by forming a polarization film on a sloped face of either one of the two rectangular prisms, and bonding the two rectangular prisms together into a cubic shape. The polarization beam splitter 3 allows a waveform whose polarization direction is parallel to a light incident surface, while reflects a waveform whose polarization direction is perpendicular to the light incident surface.

The quarter-wave plate 4 is provided for converting a linearly polarized light into a circularly polarized light or converting a circularly polarized light into a linearly polarized light. The quarter-wave plate 4 generates a difference in optical path of a quarter wavelength between an ordinary ray and an extraordinary ray of the laser beam which passes through the inside of the quarter-wave plate 4.

The objective lens 5 has a large numerical aperture (NA) of 0.85, and a working distance WD of the objective lens 5 is set to 0.300 mm corresponding to the numerical aperture NA.

The disk 8 has a high recording density, and has a protective substrate 8b formed on an information recording surface 8a. For the disk 8, any optical disk may be adopted, and non-limited examples of which include an optical disk, a magneto-optical disk, etc.

The detection-use condenser lens 6 converges a reflected light from the polarization beam splitter 3 of the light reflected from the disk 8 onto the photodetector 9 via the hologram element 7. The hologram element 7 is divided into a plurality of regions, and a light beam having passed through the detection-use condenser lens 6 is divided, and impinges on each region of the photodetector 9.

The photodetector 9 includes a plurality of light receiving elements, and converts a light (laser beam) incident on each light receiving element into an electronic signal so as to output a tracking error signal.

The focus control section 11 prepares a focus error signal based on the output signal from the photodetector 9 and controls the actuator 10 based on the focus error signal, so as to carry out a focus control.

The laser beam emitted from the semiconductor laser 1 is converted into a parallel beam by the collimator lens 2. This laser beam is then shaped from an elliptic beam into a circular beam by the beam shaping prism (not shown), and is then directed to the polarization beam splitter 3.

This laser beam passes through the polarization beam splitter 3, and is incident on the quarter-wave plate 4 where the polarization direction of the laser beam changes from a linearly polarized light into a circularly polarized light. The circularly polarized light then passes through the protective substrate 8b of the disk 8 and is converged onto the information recording surface 8a of the disk 8 by the objective lens 5.

The laser beam focused on the information recording surface 8a of the disk 8 is reflected from the data recording surface 8a and passes through the objective lens 5, and is then incident on the quarter-wave plate 4. In the quarter-wave plate 4, the polarization direction of the laser beam is converted from the circularly polarized beam to the linearly polarized beam so that the polarization direction differs from that of the return path by 90° and is then reflected from the polarization beam splitter 3. As described, in the polarization beam splitter 3, the laser beam incident on the disk 8 is separated from the laser beam reflected from the disk 8.

The laser beam reflected from the polarization beam splitter 3 is converged by the detection-use condenser lens 6. The laser beam as converged by the detection-use condenser lens 6 passes through the hologram element 7 which is divided into a plurality of regions, and is then received by the respective regions of the light receiving element of the photodetector 9. A signal to be output from each region of the light receiving element is processed by an arithmetic circuit (not shown), resulting in a focus error signal, tracking error signal and a reproducing (RF) signal.

In the following, the plural divided regions of the hologram element 7, and the focus error signal, the tracking error signal and the reproducing (RF) signal to be detected by the photodetector 9 will be explained.

Figure 2:
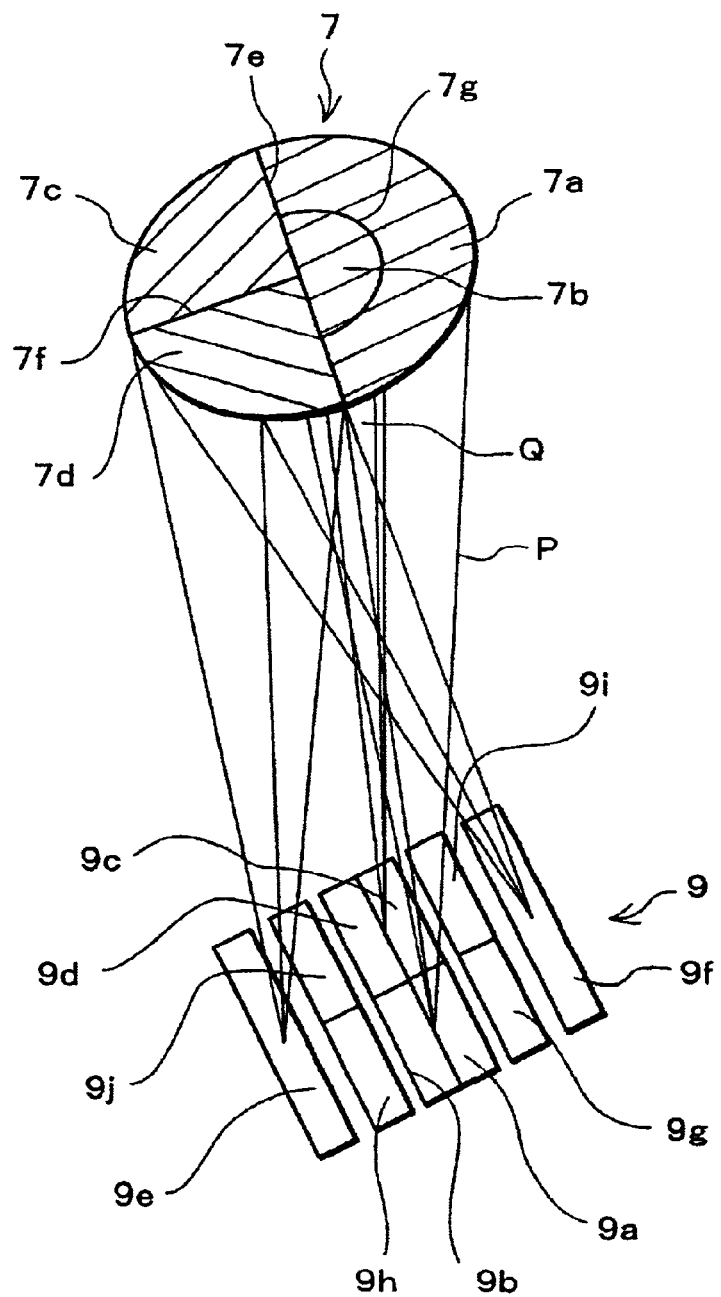
FIG. 2 is a perspective view illustrating the structures of a hologram element and a photodetector shown in FIG. 1, as well as an optical path which extends from the hologram element to the photodetector.

As illustrated in FIG. 2, the circular hologram region of the hologram element 7 is divided into two semicircular regions by a division line 7e vertical to a track of the disk 8, i.e., the semicircular region including regions 7c and 7d, and the semicircular region including regions 7a and 7b.

Of these two-divided regions, the semicircular region including regions 7c and 7d are divided into the region 7c and the region 7d by a division line 7f parallel to a track of the disk 8. On the other hand, the semicircular region including regions 7a and 7b is divided into a high numerical aperture region 7a and a low numerical aperture region 7b by an arc division line 7g, which correspond to the high numerical aperture region and the low numerical aperture region of the detection-use condenser lens 6.

The low numerical aperture region of the detection-use condenser lens 6 is defined to be a region having a numerical aperture within the range of from 0 to 0.054, while the high numerical aperture region of the detection-use condenser lens 6 is defined to be a region having the numerical aperture within the range of from 0.054 to 0.11.

As described, the hologram element 7 is divided into four regions 7a, 7b, 7c and 7d, and respective light beams which pass through and diffracted in these regions are converged on different regions on the photodetector 9 respectively.

The light receiving surface of the photodetector 9 is divided into ten regions, i.e., regions 9a to 9j, and of all these ten regions, the four regions 9a to 9j are used as auxiliary detectors.

Figure 3:
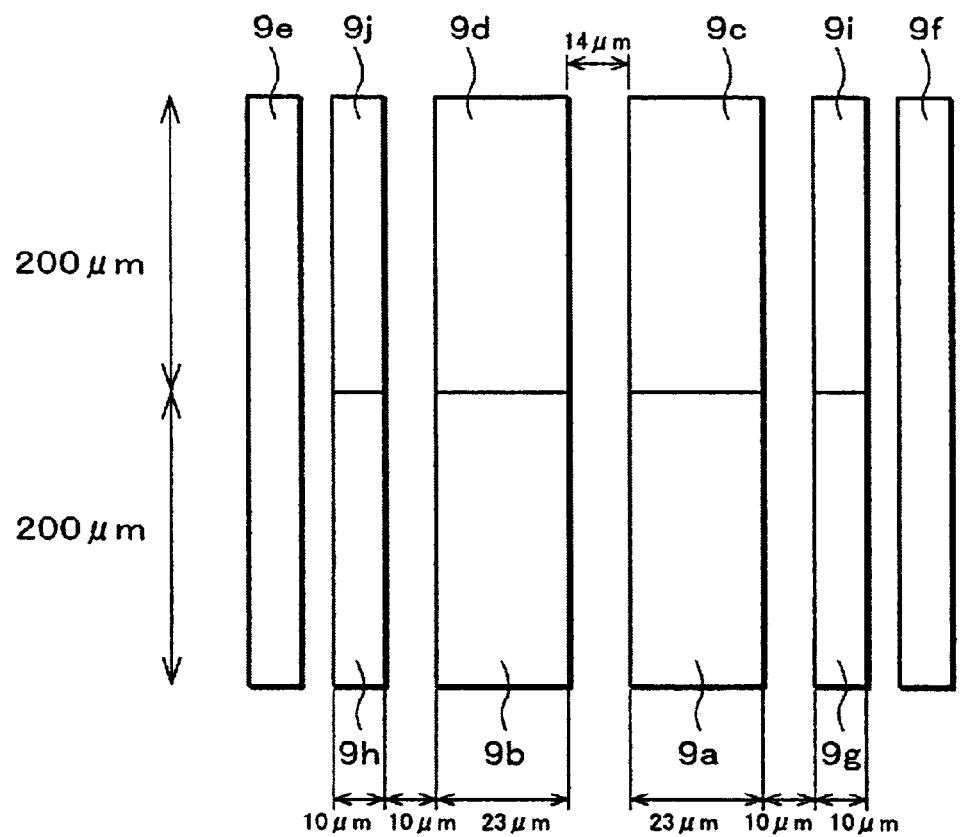
FIG. 3 is an explanatory view illustrating the arrangement of a plurality of light receiving elements provided in the photodetector shown in FIG. 1.

The respective sizes of the light receiving elements 9a to 9j are as shown in FIG. 3. Here, a gap (dead zone) between the light receiving elements 9a and 9b, and a gap between the light receiving elements 9c and 9d are set to 14 μm respectively.

The respective laser beams which pass through and diffracted in the regions 7c and 7d of the hologram element 7 are converged on the light receiving elements 9e and 9f on both sides. Then, the track error signal is detected by converging the difference between the amount of light received by the light receiving element 9e and the amount of light received by the light receiving element 9f by the push-pull method.

Irrespectively of which region of the hologram element 7, the laser beam passes through, a reproducing signal is obtained by converging the sum of the amount received by respective light receiving elements 9a to 9j.

On the other hand, the laser beam P which passes through the high numerical aperture region 7a is converged on the light receiving elements 9a, 9b, 9g and 9h (first light receiving element) aligned on one side, and the laser beam Q which passes through the low numerical aperture region 7b is converged on the light receiving elements 9c, 9d, 9i and 9j (second light receiving element) aligned on the other side.

By providing the light receiving elements 9g to 9j as auxiliary detectors, as compared to the case without these auxiliary detectors, when the laser beams P and Q are displaced from the light receiving elements 9a, 9b, 9c and 9d, the focus error signal abruptly becomes zero.

As means for detecting the focus error signal, the Foucault method is adopted. The respective output signals from the light receiving elements 9a to 9d, and 9g to 9j which receive laser beams P and Q diffracted in the regions 7a and 7b are computed by the arithmetic circuit of the focus control section 11 by the following formula:

$$FE1=((9a+9h)-(9b+9g))+((9c+9j)-(9d+9i)) \quad (1).$$

In the formula (1), respective output signals are indicated by reference numerals of the light receiving elements. As a result, the focus error signal FE1 (first focus error signal) is obtained.

The respective output signals from the light receiving elements 9c, 9d, 9i and 9j which receive laser beam Q diffracted in the region 7b are computed by the arithmetic circuit of the focus control section 11 by the following formula:

$$FE2=(9c+9j)-(9d+9i) \quad (2).$$

In the formula (2), respective output signals are indicated by reference numerals of the light receiving elements, thereby preparing the focus error signal FE2 (second focus error signal).

In the optical pickup device of the present invention, in replace of the focus error signal FE1, focus error signal FE1' (first focus error signal) prepared by the output signals of the light receiving elements 9a, 9b, 9g and 9h which receive the laser beam P diffracted in the high numerical aperture region 7a may be adopted. This focus error signal FE1' is obtained by the following formula (3):

$$FE1'=(9a+9h)-(9b+9g) \quad (3).$$

Figure 4:
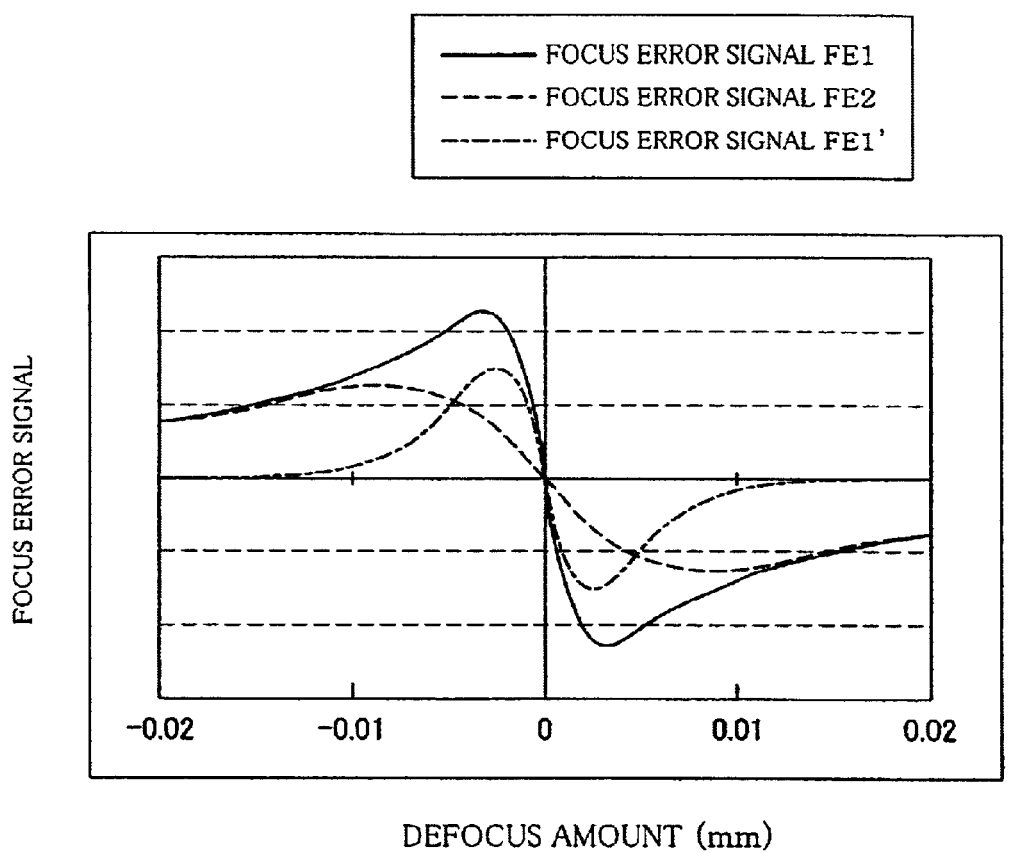
FIG. 4 is a graph showing characteristics of a focus error signal to be detected without gain adjustment in the optical pickup device in accordance with one embodiment of the present invention.

The respective characteristics of the focus error signals FE1, FE2 and FE1' thus obtained are shown in the graph of FIG. 4. In this graph, the x-axis indicates the defocus amount indicative of an amount of shift with respect to the data recording surface 8a of the focus spot by the objective lens 5 (focusing direction), and the y-axis indicates the output voltage indicative of the focus error signal. In order to obtain the equal gain of the focus servo, the characteristic of each focus error signal which is gain adjusted in an electric circuit is shown in FIG. 5.

Figure 5:
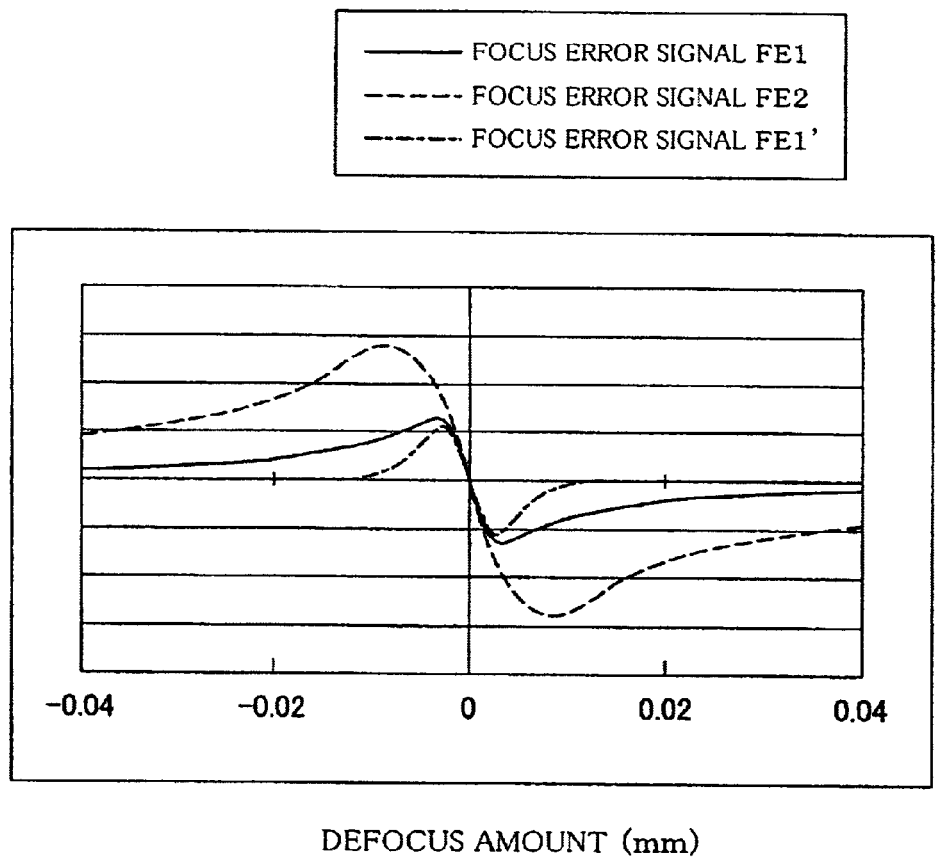
FIG. 5 is a graph showing characteristics of a focus error signal as detected after a gain adjustment in the optical pickup device of FIG. 1.
Figure 6:
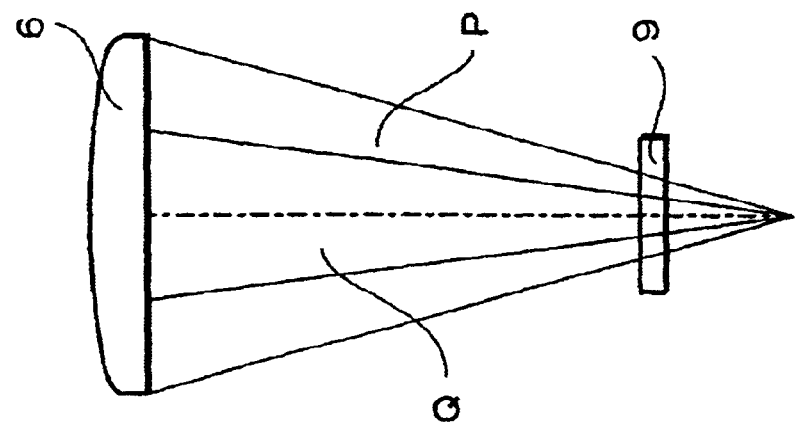
Figure 6:
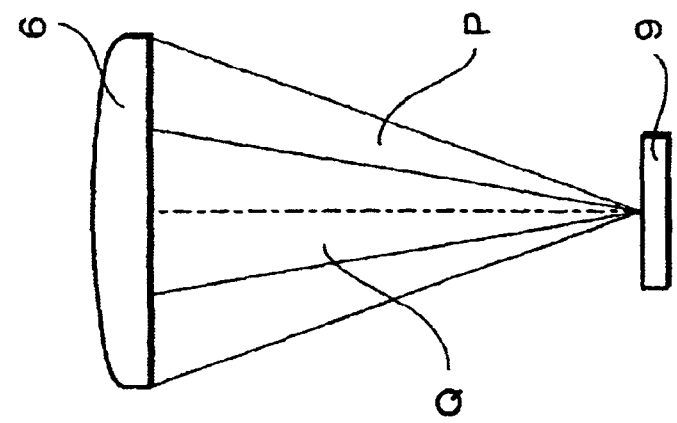
Figure 6:
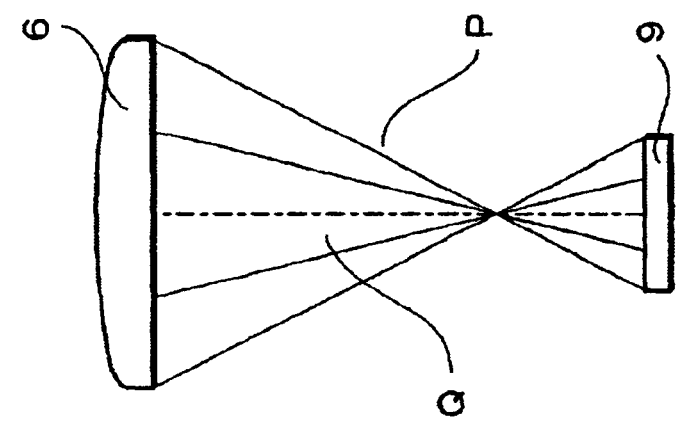

As shown in FIG. 5, the focus error signal FE1 and the focus error signal FE1' have high sensitivity within a range of small defocus amount. The focus error signal FE2 is inferior to the focus error signal FE1 and the focus error signal FE1' in sensitivity, yet a signal can be output even with a large defocus amount, namely, a broad range can be ensured for the formation of the focus servo loop.

Next, the reason why a broad range can be ensured for the formation of the focus servo loop based on the focus error signal FE2 will be explained in reference to FIG. 6(a) through FIG. 6(c). FIG. 6(a) through FIG. 6(c) schematically illustrate the expansion of the laser beams P and Q on the photodetector 9. Specifically, FIG. 6(a) shows the state where the disk 8 is positioned away from (behind) the optimal image surface of the objective lens 5. FIG. 6(b) shows the state where the disk 8 is positioned at an optimal image surface of the objective lens 5. FIG. 6(c) shows the state where the disk 8 is positioned closer to (in front of) the optimal image surface of the objective lens 5 than the focal point.

In the present embodiment, the region where the focus servo loop can be formed based on the focus error signal FE1 is around ±2 μm, while the region where the focus servo loop can be formed based on the focus error signal FE2 is around ±4 μm.

As illustrated in FIG. 6(a) through FIG. 6(c), as compared to the laser beam P which passes through the high numerical aperture range of the detection-use condenser lens 6, the laser beam Q which passes through the lower numerical aperture offers a smaller expansion on the receiving element of the light reflected from the disk 8 with respect to the shift in position of the optimal image surface of the objective lens 5.

When adopting the focus error signal FE1', the region where the focus servo loop can be formed is around ±2 μm, which is the same as the region where the focus servo loop can be formed based on the focus error signal FE1.

For the focus error detection system, an automatic gain control circuit may be adopted so as to take into consideration the factors such as temperature of the semiconductor laser, variations in output over time, variations in transmittance of the disk substrate, variations in reflectance of the recording film; the sensitivity of the recording film over time, the difference in reflectance, the difference in amount of reflected light between the address region and the data region, the difference in reflectance between the region with the recording mark and the region without the mark, etc.

As described, by dividing the light receiving regions of the hologram element 7 and the photodetector 9, the focus error signals FE1 and FE2 can be detected. These focus error signals FE1 and FE2 are subjected to arithmetic processing by the focus control section 11. Based on the result, the actuator having mounted thereon the objective lens 5 is driven, thereby forming a focus servo loop.

In the focus control section 11 for forming a focus servo loop, when adopting the focus error signal FE2 amplified by the electronic circuit, the noise components of the amounts received by the receiving elements 9c, 9d, 9i and 9j are increased, which in turn increase the noise component of the amount of light received by the light receiving elements 9c, 9d, 9i and 9j. As a result, the deviation in the normal position at a focal point of the objective lens 5 is increased.

Moreover, when only the focus error signal FE1 is amplified by an electric circuit, since the region where the focus servo loop can be formed is small, the focal point of the objective lens 5 tends to be displaced from the region where the focus servo loop can be formed.

It is therefore desirable that the focus servo loop be formed by switching the focus error signal FE1 and the focus error signal FE2.

Figure 7:
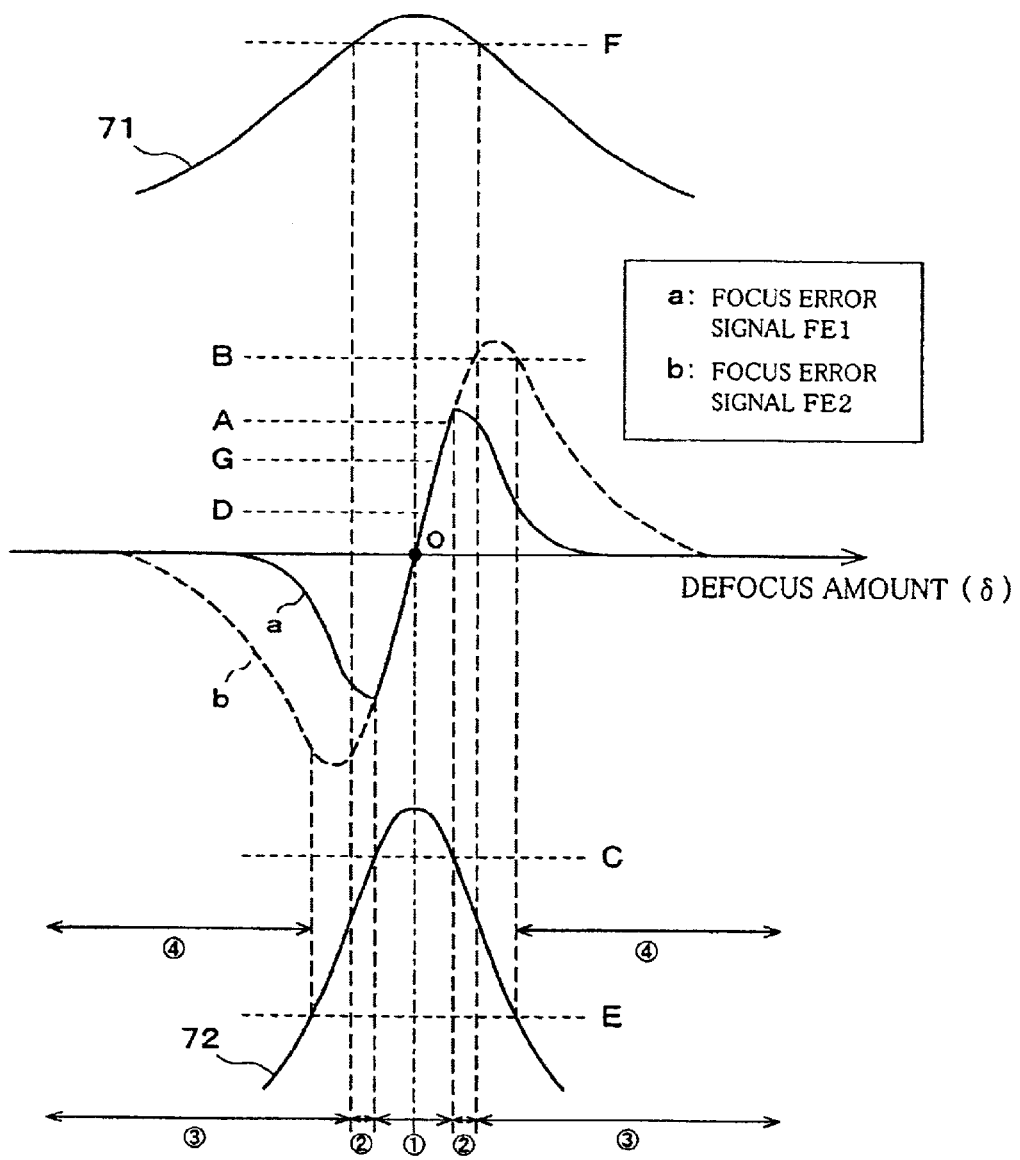
FIG. 7 shows graphs indicative of characteristics of first and second focus error signals, a total amount of received light by a light receiving element for generating a first focus error signal, and a total amount of received light by a light receiving element for preparing the second focus error signal respectively as well as respective reference values for focus control.

In the following, the switching of the formation of the focus servo loop will be explained in reference to FIG. 7. FIG. 7 shows respective characteristics of the focus error signal FE1, the focus error signal FE2, the total amount of light 72 received by the light receiving elements 9a to 9d, and 9g to 9j for preparing the focus error signal FE1; the total amount of light 71 received by the light receiving elements 9c, 9d, 9i and 9i for preparing the focus error signal FE2. In the graph of FIG. 7, the x-axis indicates an amount of defocus, while the y-axis indicates an output voltage.

Without disturbance from the exterior, because the focus servo loop is formed, the objective lens 5 is positioned where the respective output voltages of the focus error signals FE1 and FE2 are substantially zero.

On the other hand, with disturbance from the exterior, as the focal point of the laser beam is positioned greatly away from the data recording surface 8a of the disk 8a, the beam spot is displaced from the light receiving surface of the photodetector 9. As a result, the respective polarities of the output voltages indicative of the focus error signals FE1 and FE2 are inverted, and an S-curve is drawn as illustrated in FIG. 7. Namely, the focus control can be performed while output voltage of the focus error signals FE1 and FE2 are in a range of from 0 to a limit value.

Specifically, the focus control based on the output voltage of the focus error signal FE1 can be performed within the range ① of FIG. 7, while the focus control based on the output voltage of the second error signal FE2 can be performed within the ranges ① and ② of FIG. 7.

Even at an occurrence of such event that the disk 8 or the entire optical pickup device receives some impact, or the case where dust particles adhere onto the surface of the disk 8, if the shift due to these disturbances from the exterior is within the region ①, a focus servo is performed in such a manner that the objective lens 5 is positioned in a vicinity of the point 0.

However, if these disturbances from the exterior are more serious which hinder the focus servo to follow, the optimal image surface of the objective lens 5 will be displaced from the information recording surface 8a of the disk 8. Consequently, the voltage of the focus error signal FE1 changes from the region ① to the region ② or the region ③. Therefore, the focus control based on the focus error signal FE1 cannot be performed.

When the oscillation wavelength of the semiconductor laser changes abruptly with changes in temperature, and mode hopping occurs wherein the optimal image surface of the objective lens 5 is displaced with respect to the data recording surface 8a, the voltage of the focus error signal FE1 changes from the region ① to the region ② or the region ③. Therefore, the focus control based on the focus error signal FE1 can no longer be performed.

When the focus servo loop based on the focus error signal FE1 becomes not available, it is switched in the focus control section 11 from the focus control using the focus error signal FE1 to the focus control section using the focus signal FE2. As a result, it is possible to immediately move the focal point of the objective lens 5 to the region where the focus servo loop can be formed based on the focus error signal FE1.

In the following, the focus control method in respective regions ①, ②, and ③ will be explained in details.

Case 1: The Focal Point of the Objective Lens 5 is within the Region ①

In the case where the focal point of the objective lens 5 is within the region ①, i.e., the defocus amount is within the region ①, when forming the focus servo loop based on the focus error signal FE1, an absolute value of the focus error signal FE1 is not more than the first reference value A, and an absolute value of the focus error signal FE2 is not more than the second reference value B. In this case, the focus servo loop is formed based on the focus error signal FE1.

Here, the first reference value A and the second reference value B indicate the reference values based on which the switching timing of a focus servo loop to be formed is determined. Specifically, the first reference value A is set to a value around a peak point (limit value) of the focus error signal FE1, while the second reference value B is set to a value around a peak point (limit value) of the focus error signal FE2. It should be noted here that the first reference value A or the second reference value B set around the peak value indicates to be slightly smaller than the peak value in consideration of noise components of the focus error signal.

As described, by setting the first reference value A and the second reference value B to be close to the peak positions respectively, a broad range can be obtained for the formation of the focus servo loop.

Case 2: The Focal Point of the Objective Lens 5 is within the Region ①

When forming the focus servo loop based on the focus error signal FE1, if the focus servo cannot be performed by the disturbances from the exterior, the focal point of the objective lens 5 is moved to the region ②. Therefore, an absolute value of the output voltage indicative of the focus error signal FE1 becomes greater than the first reference value A, while an absolute value of the output voltage indicative of the focus error signal FE2 becomes not more than the second reference value B.

In this state, it is switched from the formation of the focus servo loop based on the focus error signal FE1 to the formation of the focus servo loop based on the focus error signal FE2.

As described, by forming the focus servo loop based on the focus error signal FE2, the focal point of the objective lens 5 approaches the region ①. Therefore, an absolute value of the focus error signal FE2 gradually reduces, and an output voltage indicative of the total amount of received light 72 by the light receiving elements 9a to 9d, and 9g to 9j increase.

Thereafter, when the output voltage indicative of the total amount of received light 72 becomes larger than the third reference value C (light amount reference value), and an absolute value of an output voltage indicative of the focus error signal FE1 falls within the range of not more than the fourth reference value D (signal reference value) shown in FIG. 7, i.e., the range where a pulling-in operation based on the focus error signal FE1 can be performed under stable condition, it is switched to the formation of a focus servo loop based on the focus error signal FE1.

Namely, the third reference value C and the fourth reference value D are set so as to ensure the formation of the focus servo loop based on the focus error signal FE1 under stable condition. Then, when the output voltage indicative of the total amount of received light 72 becomes larger than the third reference value C, and an absolute value of the output voltage indicative of the focus error signal FE1 becomes not more than the fourth reference value D, it is switched from the formation of focus servo loop based on the focus error signal FE2 to the formation of focus servo loop based on the focus error signal FE1.

Case 3: The Focal Point of the Objective Lens 5 is within the Region ①.

When forming the focus servo loop based on the focus error signal FE1 in the region ①, if the focus servo cannot be performed due to the disturbances from the exterior, and an output voltage indicative of the total amount of received light 72 by the receiving elements 9a to 9d, and 9g to 9j becomes not more than the reference value E for detecting a defocus servo (④ in FIG. 7), after moving the objective lens 5 away from the disk 8 (to the first position), an operation of pulling in the objective lens 5 to a vicinity of the disk 8 (second position) is performed.

The reference value E for detecting a defocus servo is not more than the third reference value C for determining the region which ensures a stable pulling-in operation by the focus error signal FE1. Then, by setting the reference value E to be smaller than the minimum value of variable amount of received light due to differences in reflectance of the recording film, it becomes possible to surely detect the displacement of the focus servo.

By performing a pulling-in operation in the region ④, the focal point of the objective lens 5 approaches the region ②. Then, when the output voltage indicative of the total amount of received light 71 received by the light receiving elements 9c, 9d, 9i and 9j for generating the focus error signal FE2 becomes larger than the fifth reference value F, and an absolute value of the output voltage indicative of the focus error signal FE2 becomes not more than the sixth reference value G, i.e., the range where a pull-in operation based on the focus error signal FE2 can be performed under stable condition, the formation of focus servo loop is performed based on the focus error signal FE2.

Namely, the fifth reference value F and the sixth reference value G are set respectively so as to ensure the formation of the focus servo loop based on the focus error signal FE2 under stable condition. Then, when the output voltage of the total amount of received light 71 becomes larger than the fifth reference value F, and an absolute value of an output voltage indicative of the focus error signal FE2 becomes not more than the sixth reference value G, it is switched to the formation of a focus servo loop based on the focus error signal FE2.

Further, in the formation of the focus servo loop based on the focus error signal FE2, when the output voltage indicative of the total amount of received light 72 received by the light receiving elements 9a to 9d, and 9g to 9j becomes larger than the third reference value C (light amount reference value), and an absolute value of an output voltage indicative of the first focus error signal FE1 falls within the range of not more than the fourth reference value D (signal reference value), i.e., the range where a pulling-in operation based on the focus error signal FE1 can be performed under stable value G, i.e., the range where a pull-in operation based on the focus error signal FE2 can be performed under stable condition, the formation of focus servo loop is performed based on the focus error signal FE2.

Namely, the fifth reference value F and the sixth reference value G are set respectively so as to ensure the formation of the focus servo loop based on the focus error signal FE2 under stable condition. Then, when the output voltage of the total amount of received light 71 becomes larger than the fifth reference value F, and an absolute value of an output voltage indicative of the focus error signal FE2 becomes not more than the sixth reference value G, it is switched to the formation of a focus servo loop based on the focus error signal FE2.

Further, in the formation of the focus servo loop based on the focus error signal FE2, when the output voltage indicative of the total amount of received light 72 received by the light receiving elements 9a to 9d, and 9g to 9j becomes larger than the third reference value C (light amount reference value), and an absolute value of an output voltage indicative of the first focus error signal FE1 falls within the range of not more than the fourth reference value D (signal reference value), i.e., the range where a pulling-in operation based on the focus error signal FE1 can be performed under stable condition, it is switched from the formation of focus servo loop based on the focus error signal FE2 to the formation of a focus servo loop based on the focus error signal FE1.

The fourth reference value D for use in a focus pulling-in operation is smaller than the first reference value A, and the sixth reference value G is smaller than the second reference value B. As described, by setting the fourth reference value D and the sixth reference value G for use in determining the region where the focus pulling-in operation can be performed under stable condition to a vicinity of a zero cross point of the focus error signal as in the conventional case, it is possible to perform a pulling-in operation under stable conditions.

As described, the optical pickup device of the present invention is arranged such that a focus control is performed by switching between the focus error signal FE1 and the focus error signal FE2 according to an output voltage of a focus error signal, to form a focus servo loop. The focus error signal FE1 has high sensitivity within the range of small defocus amount. Therefore, in the range of small defocus amount, a focus servo loop is formed based on the focus error signal FE1 of high sensitivity.

On the other hand, when the defocus amount becomes too large, and a focus servo based on the focus error signal FE1 cannot follow, it is switched to the formation of a focus servo loop based on the focus error signal FE2 which ensures a broader range for the formation of the focus servo loop.

In the case where the defocus amount becomes smaller after being switched to the focus servo based on the focus error signal FE2, it is switched to the focus servo based on the focus error signal FE1 of high sensitivity.

Therefore, according to the foregoing arrangement, a broader range can be ensured for the formation of the focus servo loop, and the likelihood that the focal point of the objective lens 5 is shifted to the outside of the focus servo loop can be reduced. As a result, it is possible to surely perform a desirable focus control with high sensitivity.

The foregoing effect can be achieved also when adopting the focus error signal FE1' instead of the focus error signal FE1.

Further, in the case where it becomes not capable of performing a focus servo even based on the focus error signal FE2 which offers a broader range for the formation of the focus servo loop, particularly, for example, when starting up the optical pickup device, or when the focal point is displaced to the outside of the focus servo loop, the actuator 10 having mounted thereon the objective lens 5 is driven so that the optimal image surface of the objective lens 5 is positioned at the information recording surface 8a, and the objective lens 5 is moved compulsively within the region where the focus servo loop can be formed. Thereafter, it is required to switch ON the focus servo loop composed of an optical system and a signal processing section.

Figure 8:
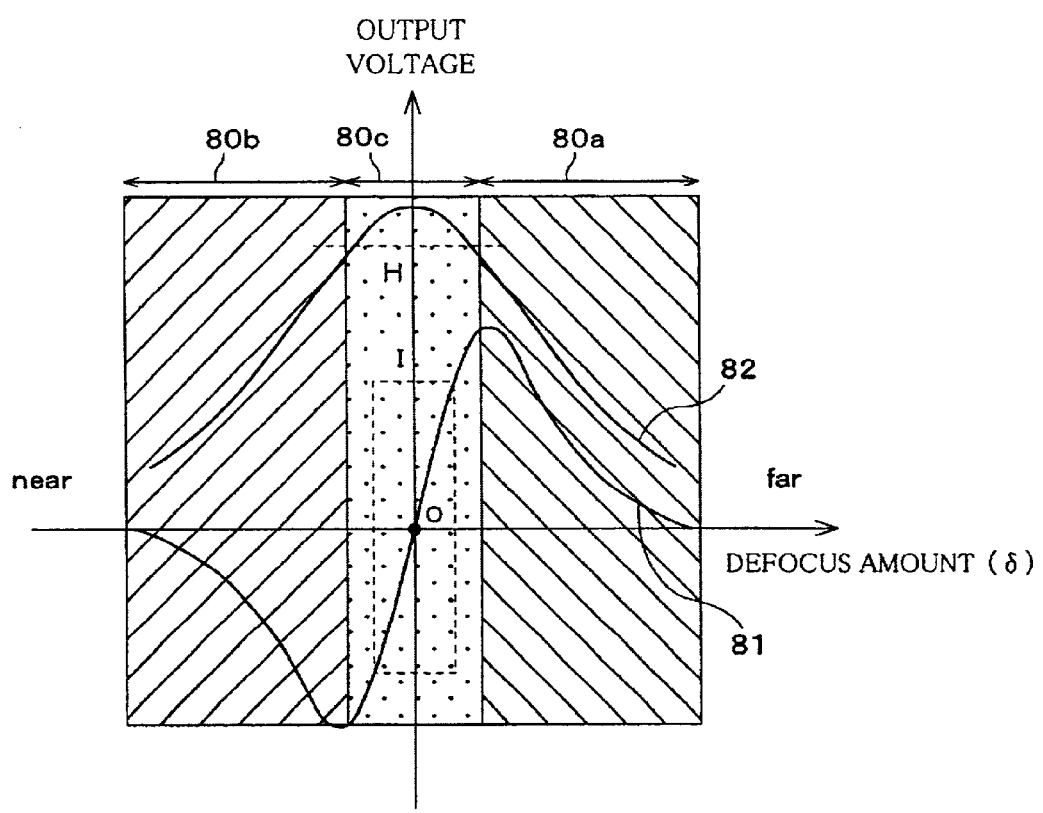
FIG. 8 is a graph showing a range where a pulling-in operation can be performed with respect to the objective lens of FIG. 1 and an unstable range where the pulling-in operation cannot be performed under stable condition.

In the following, the process of moving the objective lens 5 compulsively, and carrying out a focus pulling-in operation will be explained in reference to FIG. 8. FIG. 8 is a graph showing characteristics of the focus error signal 81 and the focus error signal 82 indicative of a total amount of received light of the receiving element for detecting the focus error signal 81. In this graph, the x-axis indicates a defocus amount, while the y-axis indicates an output voltage.

When performing a focus pulling-in operation, first, the objective lens 5 is moved compulsively away from the disk 8. Then, as the objective lens 5 is gradually moved closer to the disk 8, the objective lens 5 is moved into the first focus servo loop unstable range 80a where the first focus servo loop cannot be formed under stable condition.

Here, because the first focus servo loop unstable range 80a is a positive feedback region, by switching ON a start switch for the formation of the focus servo loop, an excessive current is applied to the actuator 10 having mounted thereon the objective lens 5, and the movement of the objective lens 5 is accelerated, and is passed through a point O (focal point) and falls in the second focus servo loop unstable range 80b. As a result, a desirable focus fulling-in operation may not be ensured.

Then, a start switch for executing the formation of the focus servo loop is turned ON when the objective lens 5 is positioned between the first focus servo loop unstable range 80a and the second focus servo loop unstable range 80b, i.e., within the focus servo loop formable range 80c.

In the focus servo loop formable range 80c, the focus servo loop may be set ON, for example, in the following manner. That is, a switch is set ON so as to form a focus servo loop in a region where an output voltage based on a total amount of light of a signal 82 indicative of a total amount of received light by the light receiving elements 9a to 9d, and 9g to 9j for detecting a focus error is larger than a reference voltage H, and an absolute value of the focus error signal 81 is not more than a reference value voltage I. In this way, a focus pulling-in operation can be performed under stable conditions.

The reference voltage H corresponds to the third reference value C based on which it is switched from the formation of the focus servo loop based on the focus error signal FE2 to the formation of focus servo loop based on the focus error signal FE1, and the fifth reference value F based on which it is switched to the formation of the focus servo loop based on the focus error signal FE2 after detecting a shift in focus servo.

The reference voltage I corresponds to the fourth reference value D based on which it is switched from the formation of the focus servo loop based on the focus error signal FE2 to the formation of focus servo loop based on the focus error signal FE1, and the sixth reference value G based on which it is switched to the formation of focus servo loop based on the focus error signal FE2 after detecting a shift in focus servo.

Alternatively, it may be arranged so as to turn on a switch for forming the focus servo loop when the output voltage based on the total amount of light of the signal 82 is larger than the reference voltage H and the focus error signal 81 becomes zero. In this case, it is also possible to perform a pulling-in operation under stable conditions.

As described, in the S-shape curve obtained by detecting an output of the focus error signal 81 with changes in interval between the objective lens 5 and the disk 8, a focus pulling-in operation is started in the state where the signal 82 indicative of the total amount of received light of the light receiving elements for detecting the focus error between the upper limit value and the lower limit value, and the objective lens 5 is moved to the focal point O where the focus error signal 81 becomes zero. As a result, a focus pulling-in operation can be performed under stable conditions.

The objective lens 5 is moved by the actuator 10 by the electromagnetic driving under an applied current to a voice coil motor.

According to the structure of the optical pickup device, the optical system is used wherein an infinite objective lens is adopted for the objective lens 5; however, the optical system wherein a finite objective lens is adopted for the objective lens 5 may be equally adopted.

Second Embodiment

Figure 9:
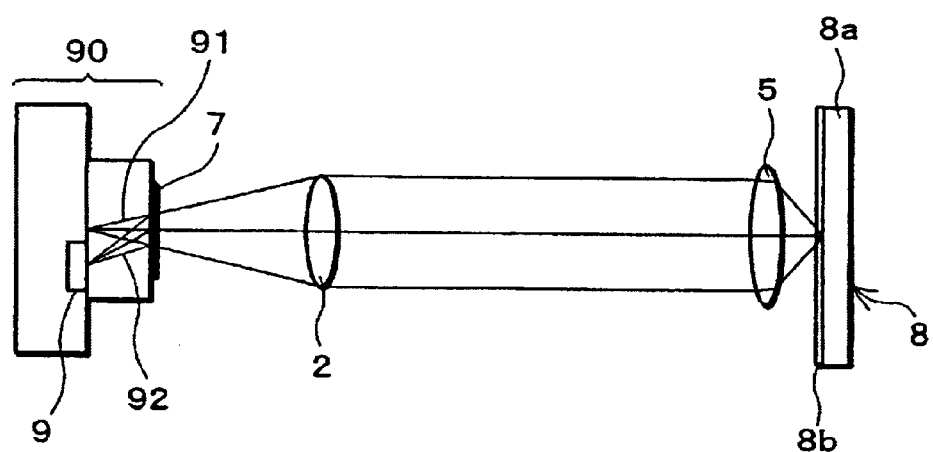
FIG. 9 is an explanatory view illustrating the structure of the optical pickup device in accordance with another embodiment of the present invention.

The following will explain another embodiment of the present invention with reference to FIG. 9. For ease of explanation, members (structures) having the same functions as those shown in the drawings pertaining to the first embodiment above will be given the same reference symbols, and explanation thereof will be omitted here.

As illustrated in FIG. 9, an optical pickup device in accordance with the present embodiment includes a collimator lens 2, an objective lens 5 and a photodetector 9. In this optical pickup device, a hologram semiconductor laser 90 equipped with a hologram element 7 is adopted, in replace of the hologram element 7 and the semiconductor laser 1 of the first embodiment which are separately provided. The foregoing optical pickup device records and reproduces information on and from a disk 8.

The optical pickup device in accordance with the present embodiment includes the hologram semiconductor laser 90 equipped with the hologram element 7 on the light emitting surface. This hologram semiconductor laser 90 emits a linearly polarized beam having a wavelength of, for example, 650 nm.

When a laser beam is emitted from the hologram semiconductor laser 90, the laser beam is diffracted by the hologram element 7. Assuming that the laser beam emitted from the hologram element 7 is a 0th order diffracted beam 91, then, the 0th order diffracted beam 91 is converted into a parallel beam by the collimator lens 2.

After being converted into a parallel beam, the laser beam having an elliptical cross-section is shaped to have a circular cross-section, and is directed to the objective lens 5. The laser beam having passed through the objective lens 5 is reflected from the disk 8, and again passes through the objective lens 5. This laser beam then passes through the collimator lens 2 and is diffracted from the hologram element 7. Here, assuming that the diffracted laser beam is the first order diffracted beam 92, then the first order diffracted beam 92 is converged onto the light receiving surface of the photodetector 9.

For the hologram element 7 and the photodetector 9, those shown in FIG. 2 adopted in the first embodiment are adopted, which permit detection of the focus error signals FE1 and FE2.

According to the arrangement of the present embodiment, a focus servo loop is formed while a focus control is being performed by switching between the focus error signal FE1 (first focus error signal) and the focus error signal FE2 (second focus error signal). As a result, a broader range can be ensured for the formation of the focus servo loop, and it is therefore possible to suppress the shifting of the focal point of the objective lens 5 from the focus servo loop. As a result, a focus control with desirable sensitivity can be surely performed.

Third Embodiment

Figure 10:
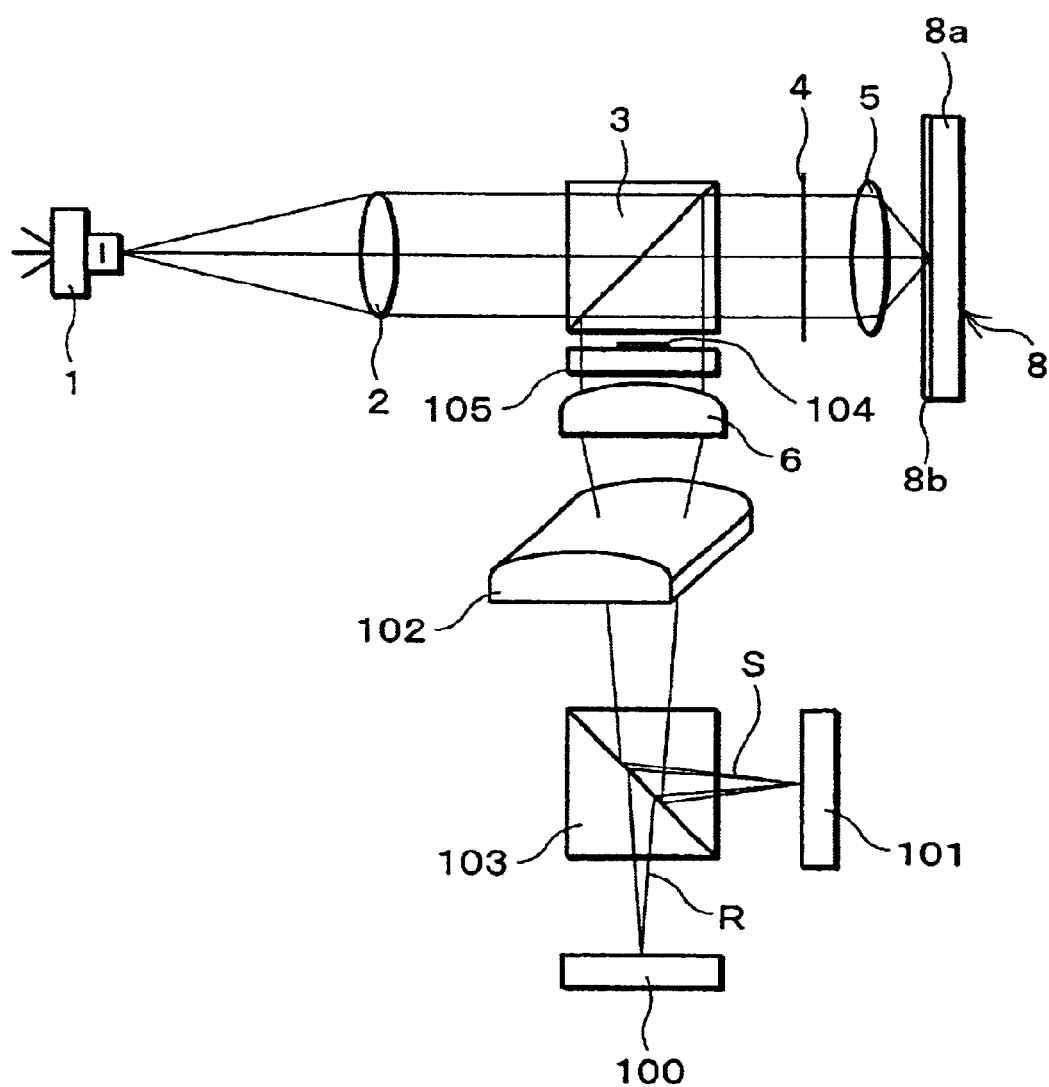
FIG. 10 is an explanatory view illustrating the structure of an optical pickup device in accordance with still another embodiment of the present invention.
Figure 11:
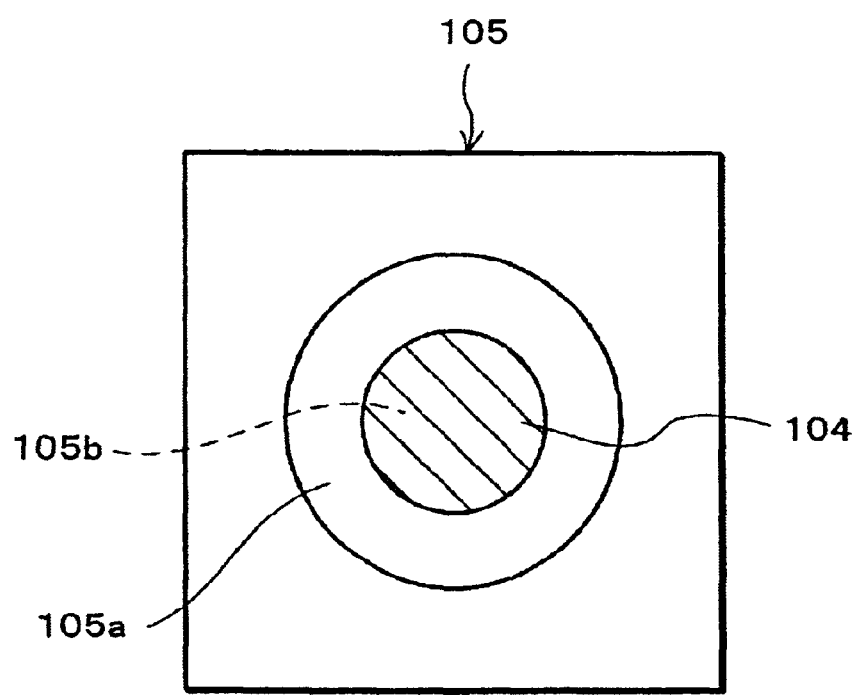
FIG. 11 is an explanatory view illustrating the detailed structure of the parallel plate of FIG. 10.

The following will explain still another embodiment of the present invention with reference to FIG. 10 and FIG. 11. For ease of explanation, members (structures) having the same functions as those shown in the drawings pertaining to the first embodiment above will be given the same reference symbols, and explanation thereof will be omitted here.

FIG. 10 is an explanatory view illustrating the schematic structure of an optical pickup device in accordance with one embodiment of the present invention. As illustrated in FIG. 10, the optical pickup device in accordance with the present embodiment includes a semiconductor laser 1, a collimator lens 2, a polarization beam splitter 3, a quarter-wave plate 4, an objective lens 5, and a detection-use condenser lens 6 as in the first embodiment. The optical pickup device in accordance with the present embodiment also includes a photodetector 100, a photodetector 101, a cylindrical lens 102, a polarization beam splitter 103, a half-wave plate 104, and a parallel plate 105. The foregoing optical pickup device records and reproduces information on and from the disk 8.

As illustrated in FIG. 11, the parallel plate 105 includes a section 105*a* corresponding to the high numerical aperture region of the detection-use condenser lens 6 and a section 105*b* corresponding to the low numerical aperture region of the detection-use condenser lens 6, and the half-wave plate 104 is formed only on the portion 105*b* corresponding to the low numerical aperture region.

The parallel plate 105 is provided in front of the detection-use condenser lens 6, so that of all the return light from the disk 8, only the polarization direction of the light which passes through the low numerical aperture region of the detection-use condenser lens 6 can be rotated by 90°.

The cylindrical lens 102 adds astigmatism only to the photodetector 100 and the photodetector 101. Here, the direction of the astigmatism is set to a direction 45° tilted with respect to the photodetector 100 and the photodetector 101. As a result, the astigmatism can be applied to the photodetector 100 and the photodetector 101 in an oblique direction with respect to a laser beam.

The semiconductor layer 1, for example, emits a laser beam having a wavelength of not more than 650 nm. A laser beam emitted from the semiconductor laser 1 is converted into a parallel beam by the collimator lens 2. Then, this laser beam having an elliptical cross-section is shaped to have a circular cross-section by a beam shaping prism (not shown), and is directed to the polarization beam splitter 3.

The laser beam directed to the polarization beam splitter 3 passes therethrough and impinges on the quarter-wave plate 4, where the polarization direction of the laser beam changes from a linearly polarized light into a circularly polarized light. The circularly polarized light then passes through the objective lens 5, and is reflected from the disk 8. This reflected light beam then returns to pass through the objective lens 5. The laser beam which passed through the objective lens 5 again impinges on the quarter-wave plate 4 wherein the direction of polarization is changed from the circularly polarized light to the linearly polarized light. However, the polarization direction of the linearly polarized light in the return path differs from the polarization direction of the linearly polarized light in the approach path by 90°. The resulting linearly polarized light in the return path is then reflected from the polarization splitter 3, and is directed to the parallel plate 105.

This laser beam then passes through the parallel plate 105 and the detection-use condenser lens 6, and is further directed to the cylindrical lens 102 where the laser beam becomes astigmatic, and is then directed to the polarization beam splitter 103.

The laser beam directed to the polarization beam splitter 103 is divided into two fluxes due to a difference in polarization direction, i.e., a laser beam R which passed through the high numerical aperture region of the detection-use condenser lens 6 and a laser beam S which passed through the low numerical aperture region. These laser beams R and S are then detected by the photodetector 100 and the photodetector 101 respectively.

Assuming that a focus error signal prepared based on the result of receiving the laser beams R and S is a focus error signal FE1 (first focus error signal), and a focus error signal prepared based on the results of receiving the laser beam S is a focus error signal FE2 (second focus error signal).

In the present embodiment, the switching of a focus control is performed based on the focus error signal FE1 and the focus error signal FE2 thus output as in the case of the first embodiment.

With the foregoing structure of the present embodiment, a focus servo loop is formed while a focus control is being performed by switching between the focus error signal FE1 and the focus error signal FE2. As a result, a broader region can be achieved for the formation of the focus servo loop. As a result, a displacement of the focal point of the objective lens 5 out of the focus servo loop is less likely to occur. As a result, a sensitive focus control can be surely performed.

In the foregoing preferred embodiment, in the half-wave plate 104, the polarization direction of the laser beam S which passes through the low numerical aperture region of the detection-use condenser lens 6 is rotated by 90°; however, it may be also arranged such that the polarization direction of the laser beam R which passed through the high numerical aperture region of the detection-use condenser 6 is rotated by 90°.

When forming the focus servo loop based on the focus error signal FE1, in a state where an absolute value of a voltage of the focus error signal FE1 is not more than the first reference value A, and an absolute value of a voltage of the focus error signal FE2 is not more than the second reference value B, a focus servo loop is prepared based on the focus error signal FE1.

On the other hand, in the state where an absolute value of a voltage of the focus error signal FE1 is larger than the first reference value A, and an absolute value of a voltage of the focus error signal FE2 is not more than the second reference value B, a formation of a focus servo loop based on the focus error signal FE1 is switched to a formation of a focus servo loop based on the focus error signal FE2.

As described, the optical pickup device of the present invention is characterized by including:

a light source for emitting a light;

a condenser lens for focusing a reflected light from a recording medium of the light emitted from the light source;

dividing means for dividing a light passed through the condenser lens into a light passed through a high numerical aperture region of the condenser lens and a light passed through a low numerical aperture region of the condenser lens;

light receiving means including at least a first light receiving element for detecting the light passed through the high numerical aperture region and a second light receiving element for detecting the light passed through the low numerical aperture region; and focus control means which prepares a first focus error signal based on an output signal at least from the first light receiving element and a second focus error signal based on an output signal from the second light receiving element, and which performs a focus control based on either the first focus error signal or the second focus error signal according to an output value from the light receiving means.

According to the foregoing structure, by the dividing means, the light passed through the condenser lens is divided into the light passed through the high numerical aperture region of the condenser lens and the light passed through the low numerical aperture region of the condenser lens. Further, the light passed through the high numerical aperture region and the light passed through the low numerical aperture region are detected by the first light receiving element and the second light receiving element of the light receiving means respectively. The focus control means at least prepares the first focus error signal based on an output signal from the first light receiving element and prepares the second focus error signal based on an output signal from the second light receiving element. Further, the focus control means selects either one of the first focus error signal and the second focus error signal according to the output value of the light receiving means, and the focus control is performed based on the focus error signal as selected.

In the above structure of the present invention, the first focus error signal has high sensitivity, while the second focus error signal ensures a broad range for the formation of the focus servo loop.

An output value of the light receiving means based on which a selection between the first focus error signal and the second focus error signal is made may be a signal indicative of the acceptance of the first focus error signal, a signal indicative of a rejection of the first focus error signal and an acceptance of the second focus error signal as a signal for forming the focus servo loop.

As described, by making a selection between the first focus error signal of high sensitivity and the second focus error signal which ensures a broad range for the formation of the focus servo loop based on an output value of the light receiving means, the focus servo loop can be formed.

It is therefore possible to increase the range for the formation of the focus servo loop while maintaining the focus servo of high sensitivity. As a result, even an occurrence of such event that the disk or the entire optical pickup device receive some impact or dust particles adhere onto the recording surface of the disk, etc., the likelihood that the focal point of the objective lens is displaced out of the focus servo loop can be reduced. As a result, a focus control with desirable sensitivity can be surely performed.

It is preferable that the above optical pickup device be arranged such that the focus control means selects as a signal for use in focus control, the first focus error signal when a value indicative of the first focus error signal is within the range where the focus control can be performed based on the first focus error signal, while selects the second focus error signal when a value indicative of the first focus error signal is outside the range where the focus control can be performed based on the first focus error signal and a value indicative of the second focus error signal is within the range where the focus control can be performed based on the second focus error signal.

According to the foregoing structure, the focus control means performs a focus control by appropriately switching between the first focus error signal of high sensitivity and the second focus error signal which ensures a broad region for the formation of the focus servo. As a result, in the focus control, it is possible to surely increase the range for the formation of the focus servo loop while maintaining the focus servo of high sensitivity.

It is preferable that the above optical pickup device be arranged such that the focus control means performs the focus control based on the first focus error signal when an output voltage indicative of a total amount of received light by light receiving elements including at least the first light receiving element of the light receiving means is larger than a light amount reference value set in a characteristic curve thereof, and an absolute value of the first focus error signal is not more than a signal reference value set in a characteristic curve thereof.

According to the foregoing structure, in the focus control means, the focus error signal to be used in the focus control can be switched to the first focus error signal appropriately.

The optical pickup device of the present invention is arranged so as to further include the objective lens and the actuator for driving the objective lens in the focusing direction, wherein when the focus control means is not capable of performing a focus control based on the first focus error signal nor a focus control based on the second focus error signal, the objective lens is moved to the first position to be away from the recording medium, and controls the actuator such that a pulling-in operation for moving the objective lens from the first position to the second position to be approximated to the recording medium when an output voltage indicative of a total amount of received light of the light receiving elements for use in obtaining the focus error signal of the light receiving means becomes a predetermined value.

By the described control of the focus control means, even when neither the focus control based on the first focus error signal nor the focus control based on the second focus error signal can be performed, it is possible to move the objective lens to a position at which the focus control can be performed without a problem of, for example, the recording medium being hit by the objective lens which causes a damage on the recording medium or the objective lens.

It is preferable that the foregoing optical pickup device be arranged such that the dividing means is composed of a hologram element.

According to the foregoing arrangement, by dividing the light by the hologram element which serves as the dividing means, it is possible to obtain a plurality of focus error signals.

The foregoing optical pickup device be arranged such that the dividing means includes a half-wave plate provided either in an optical path of the light passed through the high numerical aperture region of the condenser lens or an optical path of the light passed through the low numerical aperture region, and a polarized beam splitter.

According to the foregoing structure, it is possible to rotate by the quarter-wave plate the polarization direction of either the light passed through the high numerical aperture region of the objective lens or the light passed through the low numerical aperture region of the objective lens. As a result, it is possible to obtain a plurality of focus error signals.

Accordingly, it is possible to perform a focus control by selecting an appropriate focus error signal.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. An optical pickup device, comprising:
   a light source for emitting a light;
   a condenser lens for focusing a reflected light from a recording medium of the light emitted from said light source;
   dividing means for dividing a light passed through said condenser lens into a light passed through a high numerical aperture region of said condenser lens and a light passed through a low numerical aperture region of said condenser lens;
   light receiving means including at least a first light receiving element for detecting the light passed through said high numerical aperture region and a second light receiving element for detecting the light passed through said low numerical aperture region; and
   focus control means which prepares a first focus error signal based on an output signal at least from said first light receiving element and a second focus error signal based on an output signal from said second light receiving element, and which performs a focus control based on either the first focus error signal or the second focus error signal according to an output value from said light receiving means.

2. The optical pickup device as set forth in claim 1, wherein:
   said focus control means selects as a signal used in the focus control, the first focus error signal when a value indicative of the first focus error signal is within a range where the focus control can be performed based on the first focus error signal, while selects the second focus error signal when the value indicative of the first focus error signal is outside the range where the focus control can be performed based on the first focus error signal, and a value indicative of the second focus error signal is within a range where the focus control can be performed based on the second focus error signal.

3. The optical pickup device as set forth in claim 1, wherein:
   said focus control means performs the focus control based on the first focus error signal when an output voltage indicative of a total amount of received light by light receiving elements including the first light receiving element of said light receiving means is larger than a light amount reference value set in a characteristic curve thereof, and an absolute value of the first focus error signal is not more than a signal reference value set in a characteristic curve thereof.

4. The optical pickup device as set forth in claim 1, further comprising:
   an objective lens; and
   an actuator for driving said objective lens in a focusing direction,
   wherein said focus control means controls said actuator such that said objective lens is moved to a first position to be away from the recording medium when the focus control means becomes not capable of performing the focus control based on the first focus error signal nor performing a focus control based on the second focus error signal, and that a pulling-in operation is performed so as to move the objective lens from the first position to a second position to approach to the recording medium when an output voltage indicative of a total amount of received light by the light receiving elements for use in obtaining the focus error signal of the light receiving means becomes a predetermined value, and the focus control means performs a focus control based on the second focus error signal when the value indicative of the second focus error signal reaches a range where the focus control can be performed based on the second focus error signal.

5. The optical pickup device as set forth in claim 4, wherein:
   while a focus control is being performed based on the second focus error signal, the output voltage indicative of the total amount of received light by the light receiving elements including at least the first light receiving element of said light receiving means becomes larger than a light amount reference value set in a characteristic curve thereof, and an absolute value of the first focus error signal becomes not more than a signal reference value set in a characteristic curve thereof, the focus control based on the second focus error signal is switched to the focus control based on the first focus error signal.

6. The optical pickup device as set forth in claim 1, wherein:
   said dividing means is composed of a hologram element.

7. The optical pickup device as set forth in claim 1, wherein:
   said dividing means includes a half-wave plate provided either in an optical path of the light passed through said high numerical aperture region of said condenser lens or an optical path of the light passed through said low numerical aperture region, and a polarized beam splitter.

8. A focus control method, comprising the steps of:
   dividing a light emitted from a light source and is reflected from a recording medium into a light passed through a high numerical aperture region of a condenser lens for focusing a light beam and a light passed through a low numerical aperture region of the condenser lens;
   detecting the light passed through the high numerical aperture region of the condenser lens and the light passed through the low numerical aperture region of the condenser lens separately; and
   performing a focus control based on a first focus error signal obtained from the light passed through at least the high numerical aperture region and the second focus error signal obtained from the light passed through the low numerical aperture region, wherein the focus control is performed based on either the first focus error signal or the second focus error signal as selected based on at least one of a characteristic curve of the first focus error signal, a characteristic curve of the second focus error signal, an amount of received light for generating the first focus error signal and an amount of received light for generating the second focus error signal.

9. The focus control method as set forth in claim 8, wherein:

while the focus control is being performed based on the first focus error signal, when an absolute value of the first focus error signal becomes larger than the first reference value set in a characteristic curve thereof, and an absolute value of the second focus error signal becomes not more than the second reference value set in a characteristic curve thereof, the focus control based on the first focus error signal is switched to the focus control based on the second focus error signal.

10. The focus control method as set forth in claim 9, wherein:

said first reference value is set to a value around a limit value of the first focus error signal and is smaller than an absolute value of the limit value; and said second reference value is set to a value around a limit value of the second focus error signal and is smaller than an absolute value of the limit value.

11. The focus control method as set forth in claim 8, wherein:

while the focus control is being performed based on the second focus error signal, when an output value indicative of an amount of received light for generating the first focus error signal becomes larger than a predetermined third reference value, and an absolute value of the first focus error signal is not more than a fourth reference value set in a characteristic curve of the first focus error signal, the focus control based on the second focus error signal is switched to a focus control based on the first focus error signal.

12. The focus control method as set forth in claim 8, further comprising the steps of:

i) moving an objective lens, for focusing the light emitted from the light source onto a recording medium, to a first position to be away from the recording medium, when neither of the focus control based on the first focus error signal nor the focus control based on the second focus error signal becomes not available;

ii) after carrying out said step i), performing a pulling-in operation for moving the objective lens from the first position to a second position to be approximated to the recording medium when an output voltage indicative of an amount of received light for generating the first focus error signal becomes a predetermined value; and iii) after carrying out said step ii), carrying out a focus control based on the second focus error signal when an output voltage indicative of an amount of received light for generating the second focus error signal becomes larger than a predetermined fifth reference value, and an absolute value of the second focus error signal becomes not more than a sixth reference value set in a characteristic curve of the second focus error signal.

* * * * *